June 11, 1968
F. DAY ETAL
3,387,958
APPARATUS FOR PRODUCING FIBERS FROM HIGH
TEMPERATURE FUSIBLE MATERIAL
Filed March 18, 1965
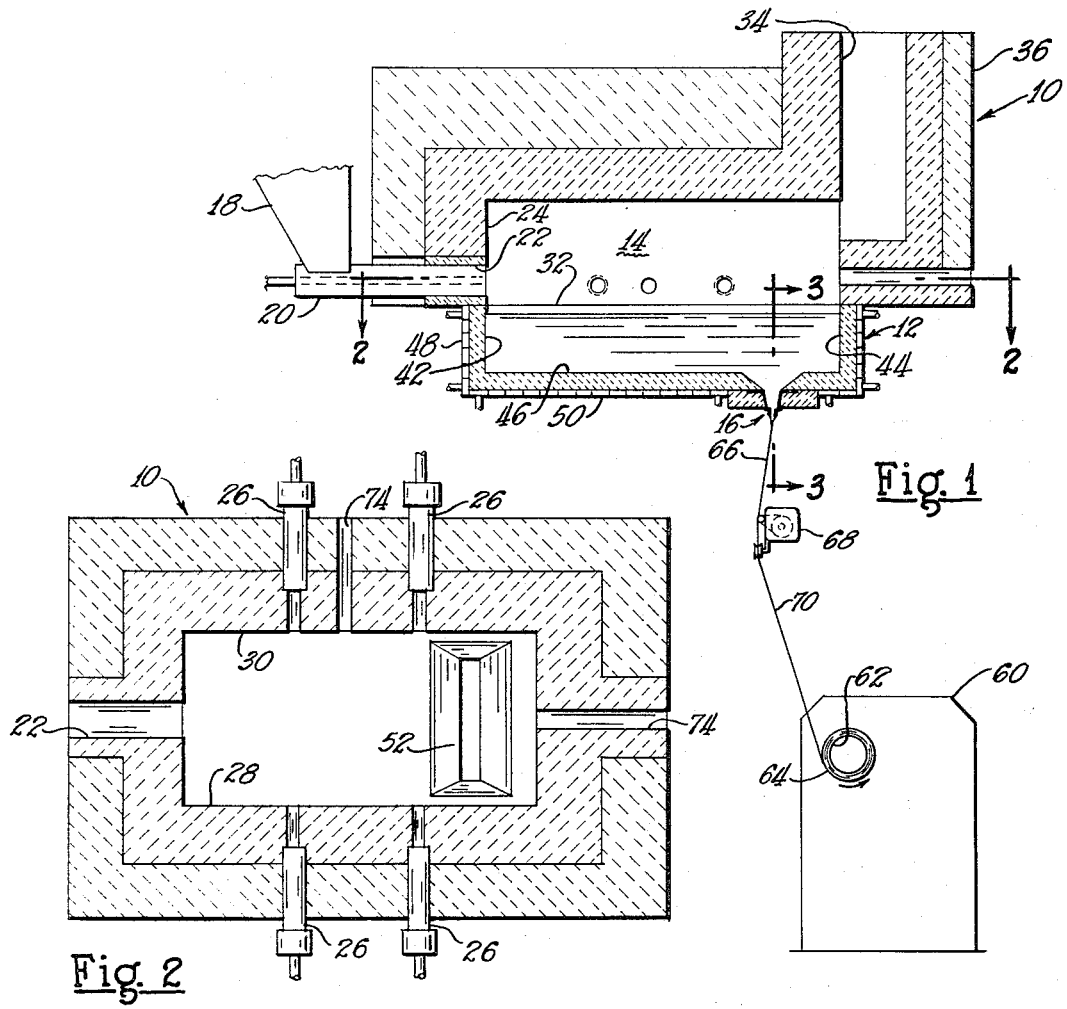
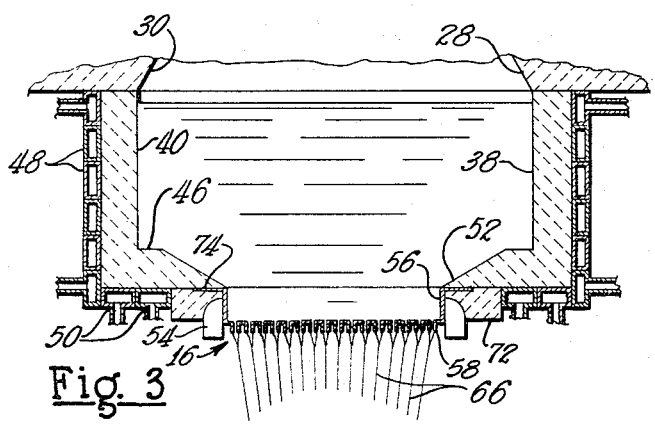
INVENTORS
FRANK DAY &
RAYMOND C. WOMELDORPH
BY
*Stachin Ourman*
ATTORNEYS United States Patent Office 3,387,958
Patented June 11, 1968

3,387,958
APPARATUS FOR PRODUCING FIBERS FROM HIGH TEMPERATURE FUSIBLE MATERIAL
Frank Day, Granville, and Raymond C. Womeldorph, Newark, Ohio, assignors to Owens-Corning Fiberglas Corporation, a corporation of Delaware
Filed Mar. 18, 1965, Ser. No. 440,678
8 Claims. (Cl. 65—1)

ABSTRACT OF THE DISCLOSURE

The invention provides apparatus for producing fibers from high temperature materials. This is accomplished in a relatively small melter, walls of which are cooled by water passages at the external surfaces thereof to maintain the walls at a reasonable temperature. In a preferred form, the walls are made of a slip-cast, seamless, fused silica. The batch material is supplied at one end of the melter and is drawn into fibers through an elongate, transverse opening at the other end. Heat is supplied by burners in the sidewalls which are directed toward one another to produce turbulence, with the sidewalls slanted inwardly to effectively heat the batch material by radiation. A flue is located at the same end of the melter as the outlet opening. The overall design enables high temperature, e.g., exceeding 2800° F., to be obtained in a small melter.

---

This invention relates to apparatus for producing fibers from fusible material which is capable of being fused only at very high temperatures.

While glass fibers and apparatus for forming them have been well known for a number of years, heretofore, it has not been possible to produce fibers in any significant quantities from glasses which fuse at high temperatures, exceeding approximately 2800° F. This has been true in spite of the fact that there has been a long-felt need for such fibers, not only because they are capable of withstanding higher temperatures but also because they usually exhibit significantly higher strengths than fibers formed from low temperature glasses.

The present invention relates to apparatus capable of forming fibers in practical quantities from fusible material which can be fused only at high temperatures, in excess of those which presently known fiber-forming apparatus can withstand. The new apparatus can be fabricated at reasonable cost and, further, consumes little more space than a conventional textile fiber bushing and its controls. The operating costs of the apparatus also are within reason so that while the cost of the fibers is above that of the more commonly known fibers, the cost is not so high that the fibers are usable only for the most sophisticated applications.

In accordance with the invention, a container for the high temperature glass has all sidewalls as well as the bottom equipped with water-cooled coils with the container itself made of a non-metallic, refractory material. Batch of the high temperature glass is supplied near one end of the container while an elongate outlet is provided near the opposite end extending transversely of the container. The glass is melted by heat from a plurality of burners directing a mixture of oxygen and fuel into a chamber above the container with a flue preferably located at the end of the chamber above the container outlet for exhaustion of the combusted gases. An electrically heated bushing for final control of the molten glass temperature is located immediately below the elongate outlet and also is positioned transversely of the container. The bushing has the usual fiber-forming tips at the bottom through which the glass is drawn to produce the fibers.

It is, therefore, a principal object of the invention to provide apparatus for producing fibers from highly refractory material capable of fusing only at very high temperatures.

A further object of the invention is to provide apparatus for producing high temperature fibers in significant quantities and at reasonable cost.

Another object of the invention is to provide apparatus of the aforesaid type which consumes an amount of space little larger than that required for a conventional bushing and controls.

Yet another object of the invention is to provide apparatus for making high temperature fibers, which apparatus can be made of relatively inexpensive materials and is of uncomplicated, low-cost design.

Other objects and advantages of the invention will be apparent from the following detailed description of a preferred embodiment thereof, reference being made to the accompaying drawing, in which:

FIG. 1 is a view in longitudinal, vertical cross section of apparatus for forming high temperature fibers in accordance with the invention;

FIG. 2 is a view in horizontal cross section taken along the line 2—2 of FIG. 1; and FIG. 3 is a fragmentary view in transverse, vertical cross section of the apparatus of FIG. 1.

Referring particularly to FIG. 1, a melting and forming unit 10 for producing high temperature fibers basically includes a melting container 12, a heating chamber 14, and a bushing 16. Batch to be melted in the unit 10 is supplied from a suitable source or hopper 18 by an auger or other suitable means 20 through a supply opening 22 in a charge end wall 24. The batch drops into the container 12 in which it is heated by means of two burners 26 located in each of two sidewalls 28 and 30 of the heating chamber 14. The heating chamber sidewalls 28 and 30, as shown in FIG. 3, slant inwardly in order to radiate heat to a pool 32 of molten glass or similar highly refractory material melted in the container 12.

The burners can be of any suitable design, either of the pre-mix type or the nozzle-mixing type, but are supplied with oxygen for combustion rather than air. This is important in a small unit of the type under consideration in order to supply sufficient heat thereto for attainment of the desired temperatures. In the preferred arrangement, the burners 26 are directly opposed so that the gases from the opposite burners intersect and cause turbulence. This assures rapid and thorough combustion. With this arrangement, the gases also are prevented from impinging on the opposite sidewall which can cause overheating and erosion of the brickwork, decreasing the life thereof. In some instances, however, some offset of the opposite burners can be used to aid in transferring more heat to the sidewalls 28 and 30. In either case, the gases eventually travel to a flue 34 formed in an end wall 36 of the unit 10 and are exhausted to the atmosphere.

The container 12 is of substantially the same size and shape as the base of the heating chamber 14 and is formed by opposed sidewalls 38 and 40, end walls 42 and 44, and a bottom 46. The four walls and bottom of the container 12 preferably are formed of fused silica which is slip-cast and provides seamless construction as well as reasonable resistance to the temperatures to which it is subjected and to the corrosive action of the glass in the container. The sidewalls of the container are backed up by cooling coils or passages 48 while the bottom is similarly backed up by cooling coils or passages 50. In a preferred arrangement, each of the sidewall coils 48 provides a single path for a supply of water while separate paths are provided through the bottom passages 50. The bottom cooling passages 50 are spaced from an elongated glass outlet 52 extending transversely of the container 12 near the end thereof opposite the charging passage 22. The fused silica walls of the container 12, the fused silica also being used in the heating chamber 14, in the area indicated by similar section lines, would ordinarily not withstand the temperatures and corrosive nature of the glass for any lengthy period of time. However, with the cooling coils 48 and 50, a layer of glass builds up on the fused silica, particularly as the silica wears away and the inner surface becomes cooler. The combination of the solid glass and the cooling coils thus actually serve as the walls, with the fused silica serving as a temporary wall.

The outlet 52 is preferably symmetrically located with respect to the charge opening 22. In this manner, all of the batch supplied through the opening 22 will travel substantially the same distance and will be subjected to substantially the same amount of heat by the time it melts and flows through the outlet 52. This arrangement is particularly important in the small space in which the glass must be melted, the entire unit 10 having a width of only approximately two feet with a length of approximately three and one-half feet. The internal dimensions of the container 12 similarly include a length of only approximately twenty inches and a width of ten inches. The base of the heating chamber 14 has similar dimensions while the height of the chamber, above the level of the pool 32, is only about seven inches.

The electrically-heated bushing 16 can be of many suitable designs and, as shown, includes terminals 54 through which current is supplied to heat thin refractory metal walls 56 of the bushing and thereby control temperature of the glass passing through. Unlike most bushings, however, the heat supplied thereto is used to maintain the glass at a uniform temperature rather than primarily for supplying heat to the glass. After the glass flows into the bushing, it is drawn through substantially conventional bushing tips 58 from which it is attenuated into fibers.

The attenuating force is provided by a motor and stand 60 (FIG. 1) which rotates a suitable collet 62 carrying a strand package 64. Filaments or fibers 66 drawn from the bushing tips 58 can be collected by a combined gathering shoe and applicator 68 and wound as a strand 70 onto the package 64. Other means can be used, however, to provide the attenuating force for the filaments and, of course, the filaments need not be collected into a strand, depending on the desired end result.

As shown specifically in FIG. 3, the bushing 16 is insulated and supported by castable refractory 72 which back up the thin walls 56 and hold bushing flanges 74 between the block 72 and the container bottom 46.

In the operation of the unit 10, the batch supplied by the slowly rotating auger 20 falls into the pool 32 and melts while slowly moving to the outlet 52. As pointed out above, the galss flowing to any part of the outlet 52 travels substantially through the same distance since the outlet 52 is transversely disposed to the supply port 22. The heat for melting the glass is supplied through the four burners 26 by a mixture of oxygen and fuel, preferably fuel gas, with the mixture burning in the chamber 14 and heating the sidewalls 28 and 30 as well as the pool 32 directly. After thorough combustion of the oxygen and fuel in the chamber 14, partly assured by the turbulence established by interference of the gases from the opposed burners, the gases are exhausted through the flue 34 located at the discharge end of the unit 10.

As shown in FIG. 2, the unit 10 is provided with suitable peepholes 74 located slightly above the level of the pool 32.

Various modifications of the above described embodiment of the invention will be apparent to those skilled in the art, and it is to be understood that such modifications can be made without departing from the scope of the invention, if they are within the spirit and the tenor of the accompanying claims.

What we claim is:
1. Apparatus for producing high temperature fibers from fusible material having a high fusing temperature, said apparatus comprising a melting container having thin refractory walls and a refractory bottom, means forming cooling passages located contiguously and in thermal contact with most of the outer surfaces of said walls and said bottom, said bottom having an outlet opening, means forming a heating chamber above said container, means for supplying batch of fusible material to said container at a point spaced from said outlet opening, burner means for directing combustion gases into said chamber above said container, a bushing below said outlet opening, and at least one fiber-forming tip at the bottom of said bushing through which fused material from said container can be drawn into fibers.

2. Apparatus for fusing material having a high fusing temperature, said apparatus comprising a melting container having thin refractory walls and a refractory bottom, means forming cooling passages located contiguously and in thermal contact with most of the outer surfaces of said walls and said bottom, said bottom having an elongate outlet opening near one end of said container, said opening extending transversely to the length of said container, means forming a heating chamber above said container, means for supplying batch of fusible material to said container at the end opposite said outlet opening, burner means for directing combustion gases into said chamber above said container, and means below said outlet opening to receive fused material from said container.

3. Apparatus for fusing material having a high fusing temperature, said apparatus comprising a melting container having thin refractory walls and a refractory bottom, means for cooling most of the outer surfaces of said walls and said bottom to maintain said walls and said bottom at a temperature below the temperature of the material being fused and below a temperature which could cause the materials of which said walls and said bottom are made to otherwise deteriorate rapidly, said bottom having an elongate outlet opening near one end of said container, said opening extending transversely to the length of said container, means forming a heating chamber above said container, means for supplying batch of fusible material to said container at the end opposite said outlet opening, burner means for directing combustion gases into said chamber above said container, and means below said outlet opening to receive fused material from said container.

4. Apparatus for producing high temperature fibers from fusible material having a high fusing temperature, said apparatus comprising a melting container having thin refractory walls and a refractory bottom, means forming cooling passages located contiguously and in thermal contact with most of the outer surfaces of said walls and said bottom, said bottom having an elongate outlet opening, means forming a heating chamber above said container, means for supplying batch of fusible material to said container at the end opposite said outlet opening, burner means for directing combustion gases into said chamber above said container, and fiber forming means for producing fibers of the fusible material located below and in communication with said outlet opening for receiving fused material through said opening.

5. Apparatus for producing high temperature fibers from fusible material having a high fusing temperature, said apparatus comprising an elongate melting container having thin refractory walls and a refractory bottom of cast, fused silica, means forming cooling passages located contiguously with all of said walls and with a substantial portion of said bottom, said bottom having an outlet opening near one end of said container and spaced from said cooling passages, said opening being elongate and extending transversely to the length of said container, means including end walls and inwardly slanted sidewalls forming a heating chamber above said container and forming a flue at the same end as said outlet opening, means for supplying batch of fusible material to said container at the end opposite said outlet opening, burner means for directing combustion gases across said chamber above said container, means for supplying oxygen and fuel to said burner means, an electrically heated bushing below said outlet opening, and at least one fiber-forming tip at the bottom of said bushing through which fused matterial from said container can be drawn into fibers.

6. Apparatus for producing high temperature fibers from fusible material having a high fusing temperature, said apparatus comprising an elongate melting container having thin refractory walls and a refractory bottom, means forming cooling passages located contiguously and in thermal contact with all of said walls and with a substantial portion of said bottom, said bottom having an outlet opening near one end of said container and spaced from said cooling passages, said opening being elongate and extending transversely to the length of said container, means forming a heating chamber above said container and a flue at the same end as said outlet opening, means for supplying batch of fusible material to said container at the end opposite said outlet opening, burner means for directing combustion gases across said chamber above said container, an electrically heated bushing below said outlet opening, and at least one fiber-forming tip at the bottom of said bushing through which fused material from said container can be drawn into fibers.

7. Apparatus for producing high temperature fibers from fusible material having a high fusing temperature, said apparatus comprising an elongate melting container having refractory walls and a refractory bottom, means forming cooling passages located contiguously and in thermal contact with most of the outer surfaces of said walls and said bottom, said bottom having an elongate outlet opening near one end of said container, said opening extending transversely to the length of said container, means forming a heating chamber and a flue above said container, means for supplying batch of fusible material to said container at the end opposite said outlet opening, burner means for directing combustion gases into said chamber above said container, a bushing below said outlet opening, and at least one fiber-forming tip at the bottom of said bushing through which fused material from said container can be drawn into fibers.

8. Apparatus for producing high temperature fibers from fusible material having a high fusing temperature, said apparatus comprising an elongate melting container having refractory walls and a refractory bottom, said bottom having an elongate outlet opening near one end of said container, said opening extending transversely to the length of said container, means forming a heating chamber above said container, said heating chamber having sidewalls slanting inwardly, means for supplying batch of fusible material to said container at the end opposite said outlet opening, a single flue at the same end of said container as said outlet opening, burner means for directing combustion gases into said chamber above said container, a bushing below said outlet opening, and at least one fiber-forming tip at the bottom of said bushing through which fused material from said container can be drawn into fibers.

References Cited

UNITED STATES PATENTS

| | | | |
|---|---|---|---|
| 1,034,824 | 8/1912 | Owens | 65—337 |
| 2,687,599 | 8/1954 | Fletcher | 65—1 |
| 3,248,203 | 4/1966 | Cunningham | 65—326 |
| 3,285,720 | 11/1966 | Drummond | 65—2 |

DONALL H. SYLVESTER, *Primary Examiner.*

R. L. LINDSAY, *Assistant Examiner.*